(12) United States Patent
Sipola

(10) Patent No.: US 7,260,073 B2
(45) Date of Patent: Aug. 21, 2007

(54) METHOD FOR SCHEDULING OF PLURAL PACKET DATA FLOWS

(75) Inventor: Jussi Sipola, Oulu (FI)

(73) Assignee: Nokia Corporation, Espoo (FI)

( * ) Notice: Subject to any disclaimer, the term of this patent is extended or adjusted under 35 U.S.C. 154(b) by 1010 days.

(21) Appl. No.: 10/307,316

(22) Filed: Dec. 2, 2002

(65) Prior Publication Data

US 2004/0105386 A1 Jun. 3, 2004

(51) Int. Cl.
*H04Q 7/00* (2006.01)
*H04J 3/00* (2006.01)
*H04B 7/212* (2006.01)
*G08C 25/02* (2006.01)
*H04L 1/18* (2006.01)

(52) U.S. Cl. ............ 370/329; 370/336; 370/337; 714/748; 714/749

(58) Field of Classification Search .......... 370/229, 370/230, 235, 329
See application file for complete search history.

(56) References Cited

U.S. PATENT DOCUMENTS

| | | | | |
|---|---|---|---|---|
| 6,532,211 | B1 * | 3/2003 | Rathonyi et al. | 370/230 |
| 7,046,678 | B2 * | 5/2006 | Jiang et al. | 370/395.41 |
| 2002/0041583 | A1 * | 4/2002 | Lintulampi et al. | 370/337 |
| 2003/0103459 | A1 * | 6/2003 | Connors et al. | 370/235 |
| 2003/0118043 | A1 * | 6/2003 | Sebire et al. | 370/412 |
| 2003/0125051 | A1 * | 7/2003 | Leppisaari | 455/466 |
| 2003/0179726 | A1 * | 9/2003 | Forssell et al. | 370/328 |
| 2004/0233895 | A1 * | 11/2004 | Linares | 370/352 |

OTHER PUBLICATIONS

"GPRS Radio Interface—Radio Link Control Details in GPRS", by Jarkko Puharinen, Tampere University of Technology, Advanced Topics in Telecommunications, Report, Apr. 7, 2000, (retrieved from the Internet on Apr. 29, 2002 under www.cs.tut.fi/kurssit/8309700/reports/puharinen.pdf).

* cited by examiner

Primary Examiner—Hassan Kizou
Assistant Examiner—Betty E. Lee
(74) Attorney, Agent, or Firm—Squire, Sanders & Dempsey L.L.P.

(57) ABSTRACT

The present invention is a method for scheduling of plural packet data flows transmitted via a single transmission resource, wherein each data flow uses a retransmission scheme providing for retransmission of packet data of a respective flow for which a positive acknowledgment of delivery of packet data to a destination was not obtained. The method includes allocating one of the plural data flows to the single transmission resource for transmission, the data flow comprising a number of data packets, first detecting that a number of data packets has been transmitted via the transmission resource, and in response thereto, generating an acknowledgment message including the acknowledgment status of each of number of data packets and allocating another one of the plural data flows to the single transmission resource.

25 Claims, 4 Drawing Sheets

(round robin scheduling)

METHOD FOR SCHEDULING OF PLURAL PACKET DATA FLOWS

BACKGROUND OF THE INVENTION

1. Field of the Invention

The present invention relates to a method for scheduling of plural packet data flows.

2. Description of the Prior Art

With the recent progress of communication technology, transmission techniques adopting a transmission of information in units of packets have become more and more popular. The packet data are transmitted via a transmission resource, i.e. a physical channel, such as a radio channel. Note that a radio channel may also be represented by a time slot of a radio channel in case of a TDMA transmission principle.

The more users access the common single transmission resource, the more important becomes the question of controlling access of individual users to the common resource, as each user generates a corresponding packet data flow to be transmitted.

SUMMARY OF THE INVENTION

The present invention provides an improved scheduling method and control device using the method. Generally, the present invention is applicable to any packet data flows to be scheduled for transmission via a single transmission resource and it is not restricted to a particular standard of packet data or communication network. The single resource may for example be an air (radio) interface in a mobile communication system; however, scheduling of packet data flows for transmission via other physical transmission resources such as wireline resources is also enabled by means of the present invention to be described hereinafter.

Thus, as mentioned before, the invention relates to the scheduling of data blocks of multiple data flows over a single resource, where each flow uses a retransmission scheme providing for retransmission of packet data of a respective flow for which a positive acknowledgment of delivery to a destination of packet data was not obtained. Such a retransmission scheme is for example realized in the Automatic Repeat reQuest (ARQ) protocol.

More specifically, the invention can be applied in GPRS (General Packet Radio System) and EGPRS (Enhanced GPRS) radio interfaces of the GSM system. In those standards, there is a selective-reject ARQ implemented in the RLC/MAC (Radio Link Control/Media Access Control) protocol and a packet scheduler schedules RLC data blocks of different Temporary Block flows (TBFs) over shared radio channels.

FIG. 3 outlines the hierarchical structure of the packet flow transmission control with reference to the OSI (Open Systems Interconnection) Layer Model. Plural packet data flows denoted as TBF1 to TBF4 are to be scheduled for transmission from a transmitting side via a common resource such as e.g. a shared radio channel to a receiving side. Each TBF may correspond to a different user accessing the common resource. The common resource is a Layer 1 resource (Physical Layer PHY). The physical layer PHY and the packet data flows are controlled/scheduled by a packet scheduler in the Media Access Control MAC layer. The MAC layer, in turn, is under control of the radio link control RLC layer in which an ARQ protocol instance is provided.

ARQ is considered to be part of the RLC protocol, which is in the protocol stack above the MAC layer, which in turn is above the physical layer. The MAC layer performs the signaling needed to instruct which terminal MS is allowed to transmit in the uplink and to indicate to which MS each block is targeted. The packet scheduler as a functional entity controls the behavior of MAC. For downlink transmission, it can be considered that the packet scheduler also activates the selected RLC instance to generate the block to be transmitted. In a practical implementation, these instances/ entities /functionalities are typically implemented close to each other and they all reside in the Packet Control Unit (PCU) logical element, i.e. either in the GPRS network or in the GPRS terminal.

Since the general topics of packet data flow scheduling are known, a further detailed description is omitted here. Nevertheless, further details may be gathered from the publication "GPRS Radio Interface—Radio Link Control Details in GPRS" by Jarkko Puharinen, Tampere University of Technology, Advanced Topics in Telecommunications, Report, Apr. 7, 2000 (retrieved from the Internet on Apr. 29, 2002 under www.cs.tut.fi/kurssit/8309700/reports/puharinen.pdf) which is incorporated herein by reference on its entirety. The above description, which will serve as an example throughout the subsequent description of the present invention, refers to the chosen example of a packet data flow scheduling via the air interface (as an example of the physical layer) in e.g. GPRS/EGPRS systems. However, in case of another common resource, the control layer arrangements may differ from the described example.

It should also be noted that FIG. 3 is a simplified representation of a protocol stack since normally a protocol stack shows the same protocols on both sides of the interface, i.e. on transmitting and receiving side. Only one side (transmitting or receiving) side can be imparted with the controlling functionality (e.g. located in the packet scheduler). Such methods require a single controlling element in charge of the shared resource, like for example an entity on the network side controlling how multiple entities such as mobile stations use the shared resource in a communication network such as a cellular network.

The general problem to be solved in scheduling resides in choosing for each available transmission (i.e. packet data flow of a user) a slot in which the packet data flow is allowed to be transmitted.

Earlier solutions include for example a round-robin scheduling principle, where each packet data flow is given a turn to transmit a certain number of blocks in a circular fashion. Basically, for round-robin scheduling, the delay from a first original transmission (O) to the last retransmission (R) is more than the entire cycle since an original transmission is transmitted during the acknowledgment delay, after a polling for acknowledgment but before receiving the acknowledgment message and performing the retransmission.

The round-robin scheduling principle is explained in greater detail with reference to FIG. 4. FIG. 4 illustrates a flow of packet data flows TBF1 to TBF3 as a function of time. The time axis is from the top of the figure to the bottom thereof, as indicated by an arrow in the upper right portion of the figure. It is assumed that the round-robin scheduling according to FIG. 4 has a sequence of allocating TBF3, TBF2, TBF1, TBF3, TBF2 . . . to the single transmission resource for transmission. Thus, there is allocated one of the plural data flows at a time. Original transmissions (packet data which are transmitted for the first time) are denoted by "O", whereas retransmissions are denoted by "R". The packet data flows are multiplexed on a single timeslot, e.g. in downlink DL, from a network entity (e.g. base station BS)

to a terminal (e.g. mobile station MS). In connection with a retransmission scheme, transmitted data blocks and/or packets have to be acknowledged. Acknowledgments are transmitted in the opposite direction, i.e. for packet transmission in DL, acknowledgments are transmitted in uplink direction UL from a terminal (e.g. mobile station MS) to a network entity (e.g. base station BS). Acknowledgments are denoted by arrows labeled "ACK". The acknowledgment delay indicated by a "}" bracket is caused by the transmission delay of the data block in the downlink, the transmission delay of the acknowledgment message in the uplink and any processing delay at either end.

For the subsequent explanations, it is assumed that as shown in FIG. 4
1. after the first original packet data block transmitted for TBF3 an acknowledgment is polled,
2. the polled ACK contains an indication that at least one packet of the original block is to be retransmitted since a positive acknowledgment of delivery to its destination was not obtained, and
3. due to transmission delays (polling for ACK in DL, transmitting ACK/NACK in uplink) and processing delays at the receiving side as well as at the transmitting side, the ACK is received and evaluated at the transmitter with a certain delay.

Note that in general, although acknowledgments have to be transmitted for every block, multiple acknowledgments are typically combined in one Ack/Nack message so that an acknowledgment message need not be transmitted after every block. In the figure, it is assumed that one block and/or data packet is transmitted in each cycle that is shown.

Thus, after polling for acknowledgment at TBF3, the transmission turn is allocated to TBF2, TBF1 and TBF3 again. At the time TBF3 is allocated again to the resource, the polled ACK has not yet been received due to the above mentioned delays. Consequently, TBF3 transmits a further original packet data. During this transmission and/or at the end thereof, the polled ACK is received. However, the original transmission is ongoing and retransmission can not be performed. Also, if the ongoing original transmission is finished, the round-robin scheduling allocates TBF2, TBF1 for transmission to complete a round-robin allocation sequence (one round-robin allocation sequence consisting of a sequence of TBF3, TBF2, TBF1). Thus, as shown in FIG. 4, the first retransmission of packet data originally sent in a first round-robin sequence can occur but in the third round-robin sequence.

Considering the time difference between the original and the first retransmission, more than one entire round-robin sequence of delay is present. Considering the difference between receipt of the ACK (during the second round-robin sequence) and the first retransmission, about ⅔ of a round-robin sequence of retransmission delay (Retransm_Delay) is present. Still further, the retransmission delay will further increase in such a situation the more TBFS are scheduled in a round-robin fashion. Namely, assuming a round-robin cycle for 6 TBF's, i.e. TBF1 through TBF6, in a sequence of TBF3, TBF2, TBF1, TBF4, TBF5, TBF6 (TBF4-TBF6 not shown in FIG. 4), then the retransmission delay would amount to ⅚ of an entire cycle.

Also, considering a certain TBF alone such as TBF3, within a respective TBF there occurs a cycle of packet data transmission. This cycle can be explained such that on the bottom of FIG. 4, the transmissions of blocks of a TBF loops back to the top, as illustrated with the arrows. Considering the second packet data block (from the top) of TBF3, the ACK message received during the transmission of this block does not contain acknowledgment information for that block. The subsequent retransmission R thus concerns packet data blocks preceding the considered block ($2^{nd}$ from the top). A retransmission R which might be caused for the considered block will however be transmitted only in the subsequent cycle of TBF3 and will follow the considered block with a delay of 21 packet data blocks. Similar considerations for TBF1 will even lead to a delay of 24 block periods.

Such delays, however, have an adverse effect on the quality of service QoS of a transmission for a particular user if the user has a delay sensitive application such as real-time transmission activated.

Consequently, the present invention provides an improved method for scheduling of plural packet data flows transmitted via a single transmission resource, which is free from the above mentioned drawbacks.

The present invention is a method for scheduling of plural packet data flows transmitted via a single transmission resource, wherein each data flow uses a retransmission scheme providing for retransmission of packet data of a respective flow for which a positive acknowledgment of delivery of the packet data to a destination was not obtained, the method comprising the steps of: allocating one of the plural data flows to the single transmission resource for transmission, the data flow comprising a number of packet data, first detecting that a certain number of packet data has been transmitted via the transmission resource, and in response thereto, generating an acknowledgment message including the acknowledgment status of each of the number of data packets and allocating another one of the plural data flows to the single transmission resource.

According to favorable further embodiments of the present invention, the method further comprises a step of second detecting a predetermined event concerning a packet data flow currently not allocated to the single transmission resource, and in response to the second detecting, interrupting the currently allocated data flow;

the predetermined event is a negative acknowledgment concerning at least one packet of a packet data flow previously allocated to the single transmission resource;

the predetermined event is the occurrence of an additional packet data flow to the plural packet data flows;

the predetermined event is the occurrence of at least one new packet of a packet data flow previously allocated to the single transmission resource for which all previous packets were transmitted;

the method further comprises the steps of deallocating the interrupted data flow currently allocated, allocating the data flow to the single transmission resource which data flow is concerned by the predetermined event, and transmitting at least one packet of the packet data flow concerned by the predetermined event;

the method further comprises the steps of, upon completion of the transmitting step, deallocating the data flow which is concerned by the predetermined event, allocating the interrupted data flow to the single transmission resource, and resuming transmission of the interrupted packet data flow;

the method further comprises the step of allocating another packet data flow upon completion of the resumed transmission of the interrupted packet data flow;

the number of packets of a specific data flow is independent from the number of packets of other data flows;

the certain number varies from time to time; and the certain number is determined during the transmission.

The present invention provides the following advantages:

the retransmissions are closer in time to the original transmissions, which reduces the delay experienced by the user and the system (for instance, the time from the first original transmission to the last retransmission (i.e. the successful retransmission, e.g. the first retransmission can be the last retransmission if it is successful) is about halved in some cases);

if incremental redundancy is applied, its memory consumption is reduced due to the shorter delay;

the probability of stalling the ARQ protocol and/or protocol instance is reduced;

the number of unnecessary retransmissions is reduced, and user throughput and spectral efficiency is increased.

Just to give an example, studies by the inventor have yielded that gains up to 20% in user data throughput and delay and spectral efficiency can be achieved.

These advantages can be achieved while only slightly changing the behavior of the RLC/MAC implementation when e.g. multiple users of GPRS/EGPRS share a timeslot.

BRIEF DESCRIPTION OF THE DRAWINGS

In the following, the present invention will be described in greater detail with reference to the accompanying drawings, in which.

DETAILED DESCRIPTION OF THE PREFERRED EMBODIMENTS

The present invention relates to a method for scheduling of plural packet data flows transmitted via a single transmission resource, wherein each data flow uses a retransmission scheme providing for retransmission of packet data of a respective flow for which a positive acknowledgment of delivery of packet data to a destination was not obtained, the method comprising the steps of: allocating one of the plural data flows to the single transmission resource for transmission, the data flow comprising a number of packet data, first detecting that a certain number of packet data has been transmitted via the transmission resource, and in response thereto, generating an acknowledgment message including the acknowledgment status of each of the number of packet data and allocating another one of said plural data flows to the single transmission resource.

This will be explained in greater detail with reference to FIG. 2, more precisely TBF2 in FIG. 2. It is assumed that the cycle of TBF2 comprises a number of six packet data blocks transmitted on TBF2. The cycle includes the blocks before the retransmissions and includes the retransmissions as well. Dependent on the success of transmissions/retransmissions, the number of retransmissions varies in subsequent cycles. Nevertheless, the number of blocks (six in the considered example) remains constant in each cycle, irrespective of the partitioning between original (O) and retransmission (R) blocks. Also the acknowledgment status of R blocks will be included in a subsequent acknowledgment message ACK.

Figure 2:
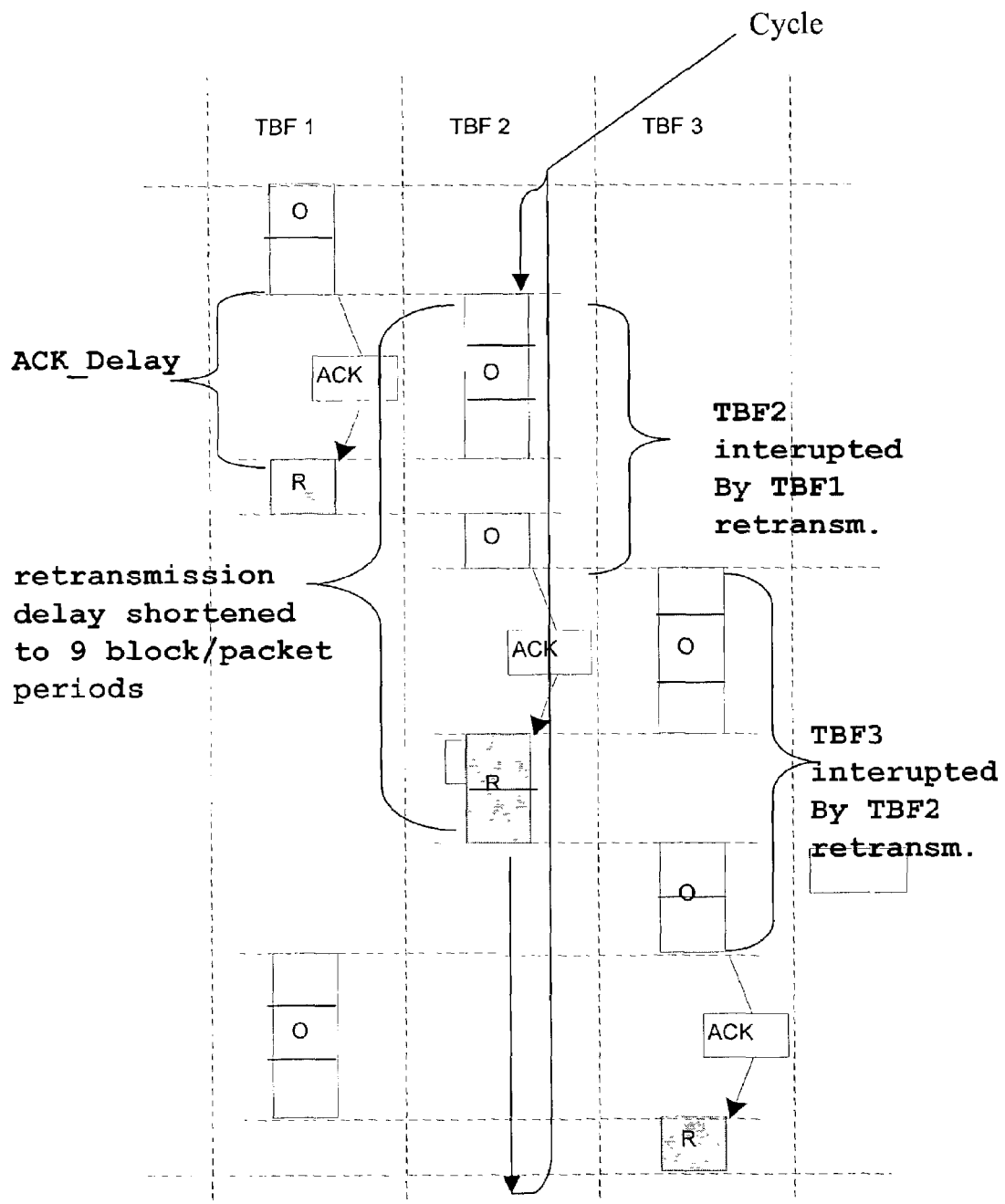
FIG. 2 shows an example of three packet data flows being multiplexed on a single timeslot of the single resource available, with the packet data flow being scheduled according to the present invention (first embodiment), FIG. 3 outlines the hierarchical structure of the packet flow transmission control with reference to the OSI (Open Systems Interconnection) Layer Model.

Now, referring to the example of TBF2 in FIG. 2 it is seen that a cycle comprises OOO-O---RR-------- (with 0 being an original transmission, R being a retransmission and - being another TBF than the considered one being assigned).

Further, a situation of two consecutive of such cycles is assumed in which in the fourth block in the above (first) cycle an ACK is transmitted. It is to be noted that this fourth illustrated block then—in the given example—corresponds to a sixth block dependent on transmission history for TBF2. A first original block which—in terms of its acknowledgment status—was not included in the ACK message is then the first block following the two R blocks. The ACK status of this block is then contained in the subsequent ACK of the next cycle. The last retransmission corresponding to the above mentioned first original block the Ack status, which was not included in the previous ACK message, occurs only 9 block periods later. This represents a significantly shorter delay than what was achieved by the round-robin scheme discussed previously.

The method further comprises a step of second detecting a predetermined event concerning a packet data flow currently not allocated to the single transmission resource, and in response to the second detecting, interrupting the data flow currently allocated. This is also illustrated in FIG. 2. The present invention can be applied to various scenarios, dependent on what kind of a predetermined event concerning a packet data flow currently not allocated to the single transmission resource is being detected. Dependent on such a predetermined event, embodiments of the present invention can be distinguished.

First Embodiment

The predetermined event is a negative acknowledgment concerning at least one packet of a packet data flow previously allocated to the single transmission resource.

The scheduler gives a single (currently allocated) data flow a "continuous", i.e. cyclic/repeated transmission turn, which is possibly interrupted by retransmissions of another packet data flow, after which transmission turn the turn is given to another flow (i.e. another packet data flow is then allocated). The ARQ protocol instance provides for sending an acknowledgment message which includes the receive status of blocks until a certain last block. The scheduler and the ARQ protocol instance co-operate so that the last block whose receive status is included in the acknowledgment message is the same block as the last block of the transmission turn and the acknowledgment message is sent "as soon as possible" after the block is received. "As soon as possible" or "immediate" retransmission means that retransmissions (of a data flow currently not allocated to the resource) are prioritized over original transmissions (of a data flow currently allocated to the resource), so that a retransmission of one TBF has priority over original transmissions of other TBFs. This means that the normal scheduling algorithm is by-passed when a retransmission is performed.

The expression "certain last block" means that a certain (sometimes predetermined) number of data packets are transmitted per continuous packet data flow before an acknowledgment procedure is carried out for this number of packets. The number of packets of a specific data flow is independent from the number of packets of other data flows, while the predetermined number may also vary from time to time. Also, the number may be determined during transmission. An acknowledgment procedure comprises the signaling involved in informing the transmitting side of the successful or non-successful delivery of the packet data to the destination. Acknowledgment procedures differ for uplink and downlink transmission, as are explained hereinafter in more detail.

In the GPRS system, which has been chosen as an example only for explanation purposes, the decision when an acknowledgment message should be sent is always made by the network. In downlink data transfer, this is accomplished by polling (requesting) the MS to transmit the Ack/Nack, but in the uplink data transfer, the network simply transmits the Ack/Nack message when "it so decides", based on its knowledge of the number of packets to be transmitted. Therefore no polling is needed in uplink data transfer.

Two methods are possible, depending on how the co-operation between the scheduler and the ARQ protocol instance is arranged. The first method is especially suitable for the uplink and the second for the downlink, although both methods are of course possible in each link.

1. The scheduler schedules the flows so that each flow transmits a number of consecutive blocks. When detecting that a different flow is to be scheduled, the ARQ protocol transmits an acknowledgment message.

2. The ARQ decides to transmit an acknowledgment message after a number of blocks have been received. When the scheduler detects that an acknowledgment message is sent or will be sent, and that the status of another block from the current flow is no longer to be included in the message, it starts scheduling blocks for another flow.

The difference between the methods is which algorithm is computed first, polling or scheduling. The second algorithm then depends on the decisions of the first one. In method 1, the scheduler decides how many blocks/packets to transmit, and the polling is generated by the ARQ when noticing that the scheduler is about to change the TBF. In method 2, the ARQ makes the decision on when to poll or to send an acknowledgment, and when the scheduler notices that this has been done, it can change to a different TBF. Method 2 is especially suitable for the downlink, as in the downlink, the last block whose Ack/Nack status is indicated in the Ack/Nack message is the block which is polled. Thus the scheduler simply changes the TBF in the block following the poll. If the same method is applied in the uplink, the network needs first to make a decision on when to send Ack/Nack and stop the scheduling before the Ack/Nack so that the last block from the terminal, e.g. MS, is received just before transmitting the Ack/Nack. The network must take the decision to transmit Ack/Nack quite early and also it must know the round-trip delay RTT between the MS and the network. The predetermination of the "certain number", in either method, the number could be a parameter or it could vary from TBF to TBF and/or from time to time based on some algorithm and/or dependent on the application and/or determined during the application is running.

Figure 1:
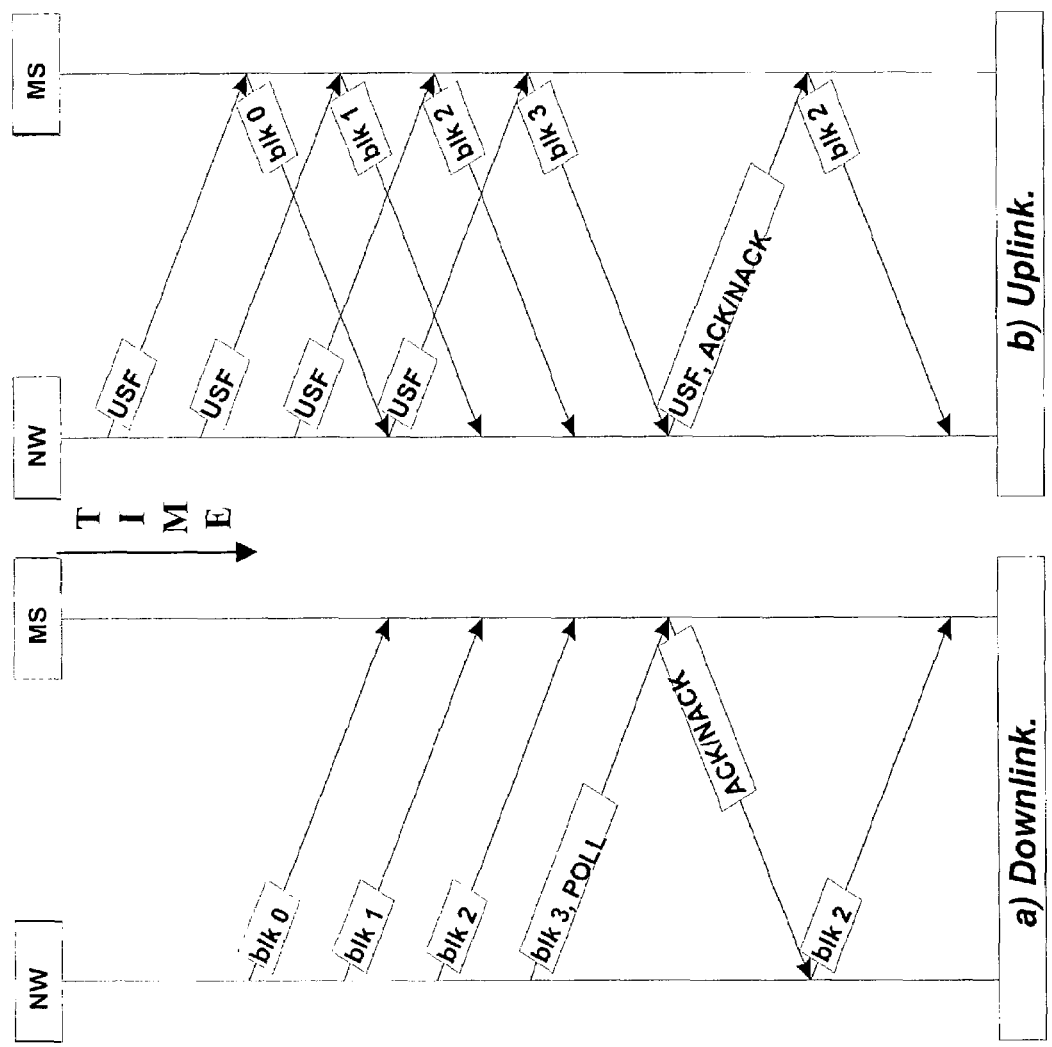
FIG. 1 shows, on a level of individual blocks forming a packet data flow, the behavior of the invention in downlink (FIG. 1a) and uplink (FIG. 1b), respectively.
Figure 3:
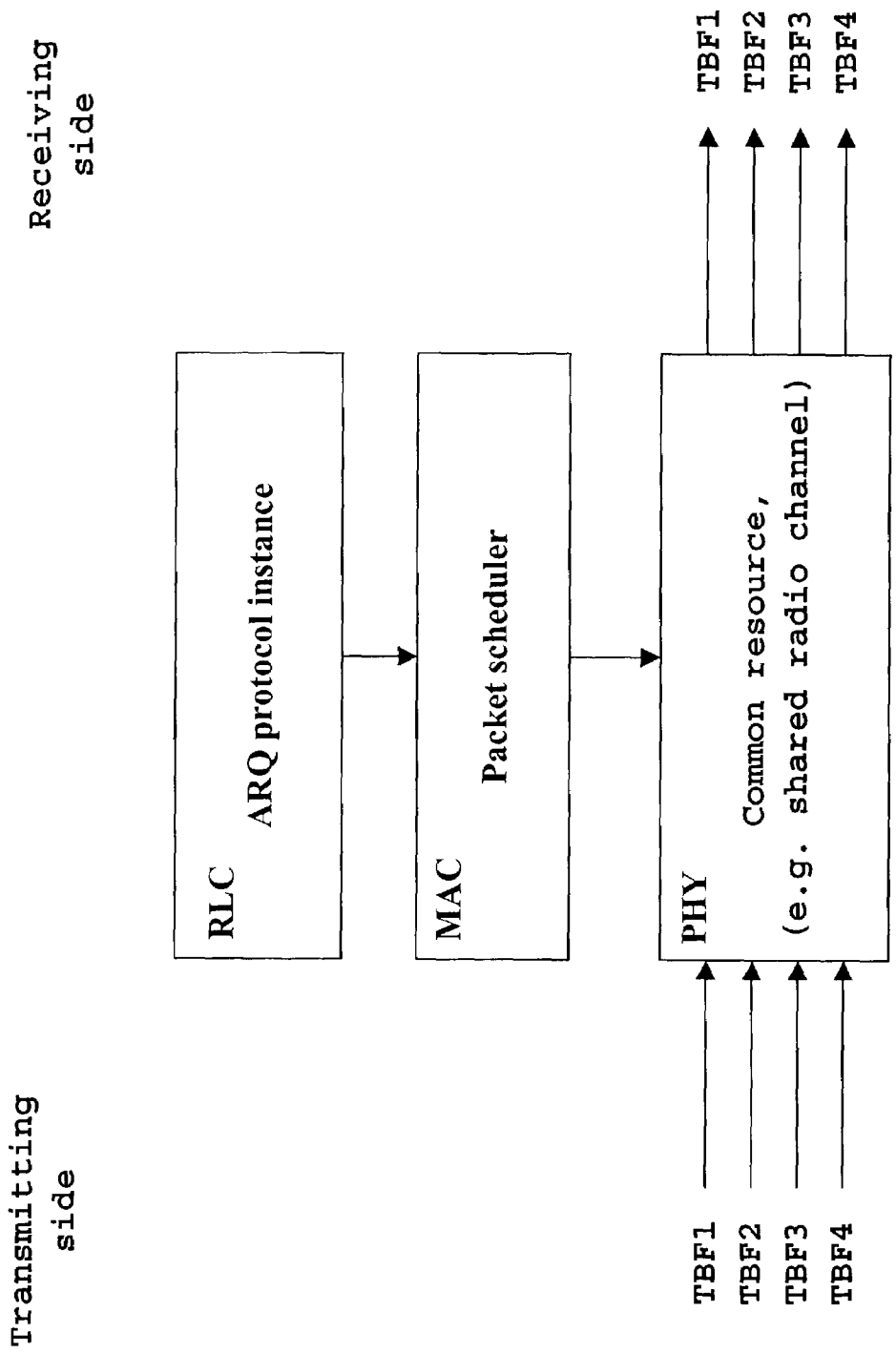

The above explanations describe the method according to the present invention as implemented in the ARQ protocol and the packet scheduler (cf. FIG. 3) is set out in more detail with reference to FIGS. 1 and 2, respectively.

FIG. 1 comprises FIGS. 1a and 1b. Each of these FIGS. 1a and 1b illustrates a packet data flow on a block level for an individual packet data flow (TBF) allocated to the shared resource. It is assumed that the predetermined number of blocks constituting a continuously scheduled packet data flow comprises 4 blocks blk0 to blk3 which are consecutively transmitted in time.

FIG. 1a concerns the downlink transmission from a network entity represented as NW to a terminal represented as MS. The network entity transmits blocks blk0 to blk3 to the terminal MS. As the network entity "knows" that only four blocks in this example are to be transmitted, the fourth block blk3 includes a poll, i.e. a request for an acknowledgment that the blocks were correctly received (Ack) or not (Nack). Upon receipt of the poll, the terminal MS returns the acknowledgment message (in uplink) direction to the network entity NW. Also, upon completion of the transmission of blk3, another packet data flow (TBF) (not shown in FIG. 1a) is allocated to the shared resource.

Upon receipt of the poll, the terminal MS returns the acknowledgment message (in uplink) direction to the network entity NW. (The transmission of the Ack/Nack in uplink occurs simultaneously or "overlapping" the downlink transmission of the blocks of the other allocated packet data flow (not shown). In the present example, it is assumed that the Ack/Nack message indicates that blocks blk0, blk1, blk3 were received correctly, while block blk2 was not received at all or not received correctly. Stated in other words, a positive acknowledgment of delivery to a destination was not obtained for block blk2. As a result, due to the implemented retransmission scheme providing for retransmission of packet data of a respective flow for which packet data a positive acknowledgment of delivery to a destination was not obtained, retransmission of block blk2 is arranged for by the network entity upon receipt of the Ack/Nack message.

This retransmission of block blk2 interrupts the allocated packet data flow (not shown in FIG. 1a), which was allocated after the transmission of blocks blk0 to blk3 of the illustrated flow was completed. Thus, upon detecting a predetermined event (i.e. necessity for retransmission) concerning a packet data flow currently not allocated to the single transmission resource (the flow shown in FIG. 1a was deallocated after transmission of the predetermined number (here: 4) of packets), the data flow currently allocated is interrupted.

During the interrupt of the currently allocated packet data flow, the retransmission of blk2 is performed, and subsequently, the transmission of the interrupted packet data flow is resumed. This is explained also with reference to FIG. 2 to be described hereafter.

FIG. 1b illustrates a similar scenario in uplink transmission where a terminal MS sends data blocks forming a packet data flow to the network, i.e. a network entity NW. Prior to the transmission of a block blk, the network entity informs the terminal by means of so-called uplink state flags USF of the availability of uplink resources for transmission of the terminal. Thus, in response to an USF, a respective block blk0 to blk3 is transmitted from the MS to the NW. The network entity knows in this chosen example that a continuous transmission turn comprises four packets and may detect/count the number of received packets, or the packets themselves indicate their packet number thereby informing the network entity about the end of the continuous transmission turn of the temporary block flow TBF illustrated in FIG. 1b. In any case, the network entity returns an Ack/Nack message together with an USF to the terminal MS upon receipt of the fourth block. In response thereto, the terminal MS arranges for retransmission of the block, blk2 for example, for which a positive acknowledgment of delivery to its destination was not obtained.

Similarly as described in connection with FIG. 1a, although not shown in FIG. 1b, another TBF is allocated to the shared resource upon transmission of the predetermined number of blocks, and the retransmission of block blk2 interrupts the another TBF allocated to the shared resource.

Figure 4:
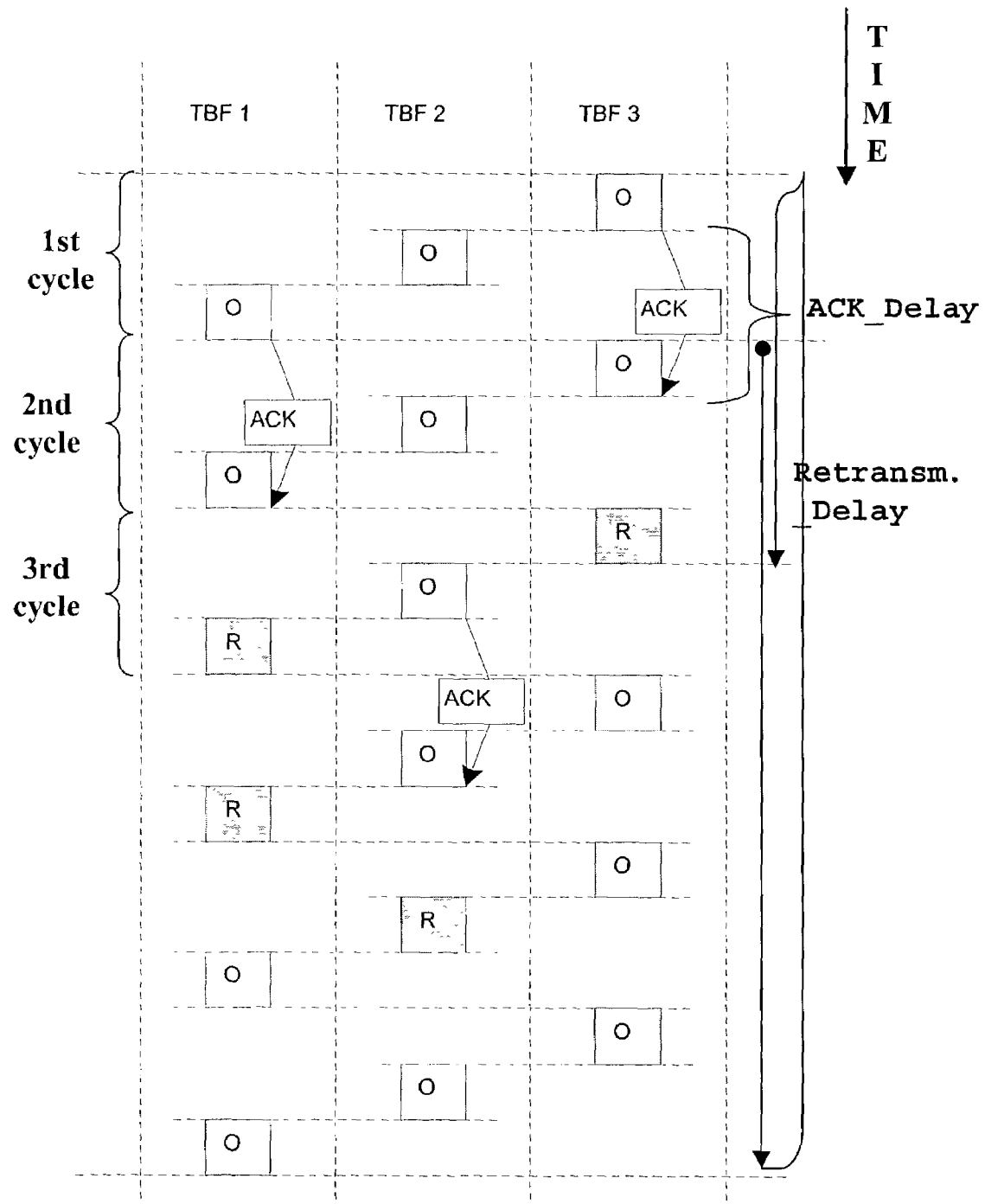
FIG. 4 illustrates a round-robin scheduling principle according to prior art.

FIG. 2 shows an example of three packet data flows being multiplexed on a single timeslot of the single resource available, with the packet data flow being scheduled according to the first embodiment of the present invention. The notation and symbols used in FIG. 2 corresponds to the one used and explained in connection with FIG. 4.

As shown in FIG. 2, a packet data flow TBF1 is initially allocated to the resource (transmission channel). The original (initial) packets and/or blocks transmitted are denoted with "O". Within the rectangle denoted with "O", a block-wise transmission as shown in and explained in connection with FIG. 1a takes place.

After all blocks up to the e.g. predetermined number of blocks has been transmitted for TBF1, another packet data flow, i.e. TBF2 is allocated to the resource. While blocks of TBF2 are transmitted, the acknowledgment message ACK concerning the previously allocated TBF1 is transmitted and received/processed at the ARQ protocol instance. Stated in other words, upon the poll for an ACK in a TBF, the TBF is changed to another TBF.

Upon detecting the necessity for retransmission of at least one block/packet of those blocks and/or packets of TBF1 previously sent, i.e. upon detection of a predetermined event concerning a packet data flow (TBF1) currently not allocated to the single transmission resource, the data flow currently allocated (TBF2) is interrupted.

Then, the interrupted data flow currently allocated (TBF2) is deallocated, and the data flow is allocated to the single transmission resource, which data flow is concerned by the predetermined event (TBF1), and there is transmitted at least one packet of the packet data flow concerned by the predetermined event, i.e. the block or blocks to be retransmitted is/are transmitted (denoted by "R"). Upon completion of the transmitting step, there is performed a deallocation of the data flow which is concerned by the predetermined event (TBF1), and the interrupted data flow (TBF2) is allocated to the single transmission resource again, and transmission of the interrupted packet data flow TBF2 is resumed. As shown in FIG. 2, another packet data flow TBF3 is allocated upon completion of the resumed transmission of the interrupted packet data flow TBF2 (upon polling for ACK of TBF2)

Thereafter, the same scheme as described in relation to TBF2 being interrupted by TBF1 occurs in the illustrated example in relation to TBF3 being interrupted by TBF2.

Thus, retransmission can be performed immediately, i.e. with an undue delay, upon receipt of the Ack/Nack message indicating that at least one block/packet is to be retransmitted because retransmission is prioritized over an ongoing allocated packet data flow, which is interrupted for retransmission of packets belonging to a previously allocated packet data flow.

Second Embodiment

According to a second embodiment of the present invention (not illustrated in the drawings) the predetermined event resides in the occurrence of an additional packet data flow to the plural packet data flows. Stated in other words, assume that TBF1 to TBF3 are scheduled and processed according to the present invention, and assume further that an additional flow TBF4 enters the system. Upon detection that such an additional flow occurs, an ongoing transmission of e.g. TBF1 when allocated to the resource is interrupted in order that blocks of the new flow TBF4 are transmitted. The remaining procedure is quite the same as with the first embodiment, apart from the different event that is detected.

Third Embodiment

According to a third embodiment of the present invention (not illustrated in the drawings) the predetermined event resides in the occurrence of at least one new packet of a packet data flow previously allocated to the single transmission resource for which all previous packets were transmitted. Stated in other words, assume that TBF1 to TBF3 are scheduled according to the present invention, but that no blocks are to be transmitted any longer for TBF1, for example, which flow is "exhausted". Upon occurrence of at least one further block for TBF1, then e.g. TBF2 or TBF3 is interrupted for and/or by the transmission of such further blocks. Such interruption could be provided such that it occurs already for an single block, or such that it occurs only if a certain minimum number of blocks (greater than one) are to be transmitted. The remaining procedure is quite the same as with the first and/or second embodiment, apart from the different event that is detected.

Other Embodiments

Furthermore, it will be understood that the present invention may also work properly if these events occur in a combined manner. That is, during an allocated packet data flow, one or more of these events may occur either consecutively (case 1), or "simultaneously" in time (case 2). Note that an event could be judged as occurring simultaneous to another event if these events are occurring within a predetermined time window. Then, all events occurring within the time window can be sorted according to their priority and/or the priority of the packet data flow they concern. The predetermined time window is triggered by the event occurring first. Events occurring not within the same time window will then be judged as "consecutive" events.

Then, for case 1, an allocated packet data flow may be interrupted many times, each interruption being caused by one of the consecutive events (provided that transmissions related to the data flow concerned by the event occurring first in time has been finished and the allocated packet data flow has been resumed at the time of occurrence of the further event).

Also, for case 2, an allocated packet data flow may be interrupted by the event which occurred first in time (within the time window), and transmissions related to the data flow concerned by the event occurring first in time may in turn be interrupted by a further event occurring later in time (provided that transmissions related to the data flow concerned by the event occurring first in time has not been finished at the time of occurrence of the further event); that is, a hierarchical interrupting scheme of data flows could be implemented. Alternatively, the data flows concerned by the respective events could consecutively be processed, that is, the allocated data flow is interrupted only once, with the duration of the interrupt being determined by the consecutive packet data transmissions of those data flows concerned by the respective events.

In case of plural "simultaneous" events, events can be prioritized based on an event priority, or a packet data flow can be prioritized over another packet data flow irrespective of the occurring event concerning a respective data flow.

Alternatively, an allocated data flow is interrupted only once and further events after a first event are processed after the allocated data flow has been resumed and completed.

Accordingly, as has been described herein above, the present invention relates to a method for scheduling of plural packet data flows transmitted via a single transmission resource, wherein each data flow uses a retransmission scheme providing for retransmission of packet data of a respective flow for which packet data a positive acknowledgment of delivery to a destination was not obtained, the method comprising the steps of: allocating one of the plural data flows to the single transmission resource for transmission, the data flow comprising a number of data packets, first detecting that a number of data packets has been transmitted via the transmission resource, and in response thereto, generating an acknowledgment message including the acknowledgment status of each of the number of data packets and allocating another one of the plural data flows to the single transmission resource.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

The invention claimed is:

1. A method comprising:
   allocating one of a plurality of data flows to a single transmission resource for transmission, wherein each data flow uses a retransmission scheme providing for retransmission of packet data of a respective flow for which packet data a positive acknowledgment of delivery to a destination was not obtained and the data flow comprising a number of packet data;
   first detecting that the number of packet data has been transmitted via the transmission resource, and
   in response thereto,
   generating an acknowledgment message including the acknowledgment status of each of the number of packet data;
   allocating another one of the plural data flows to the single transmission resource;
   second detecting a predetermined event concerning a packet data flow currently not allocated to the single transmission resource; and
   in response to the second detection, interrupting the currently allocated data flow.

2. A method according to claim 1, wherein:
   the predetermined event is a negative acknowledgment concerning at least one packet of a packet data flow previously allocated to the single transmission resource.

3. A method according to claim 1, wherein:
   the predetermined event is the occurrence of an additional packet data flow to the plural packet data flows.

4. A method according to claim 1, wherein:
   the predetermined event is the occurrence of at least one new packet of a packet data flow previously allocated to the single transmission resource for which all previous packets were transmitted.

5. A method according to claim 1, further comprising:
   deallocating the interrupted data flow currently allocated;
   allocating the data flow to the single transmission resource which data flow is influenced by the predetermined event; and
   transmitting at least one packet of the packet data flow concerned by the predetermined event.

6. A method according to claim 5, further comprising:
   upon completion of the transmitting,
   deallocating the data flow which is influenced by the predetermined event;
   allocating the interrupted data flow to the single transmission resource; and
   resuming transmission of the interrupted packet data flow.

7. A method according to claim 6, further comprising: allocating another packet data flow upon completion of the resumed transmission of the interrupted packet data flow.

8. A method according to claim 1, wherein:
   the number of packets of a specific data flow is independent from the number of packets of other data flows.

9. A method according to claim 1, wherein the number varies from time to time.

10. A method according to claim 9, wherein: the number of packets of a specific data flow is independent from the number of packets of other data flows.

11. A method according to claim 1, wherein the number is determined during the transmission.

12. A method according to claim 11, wherein: the number of packets of a specific data flow is independent from the number of packets of other data flows.

13. A control device comprising:
   a scheduler configured to allocate one of a plurality of data flows to a single transmission resource for transmission, wherein each data flow uses a retransmission scheme providing for retransmission of packet data of a respective flow for which packet data a positive acknowledgment of delivery to a destination was not obtained and the data flow comprising a number of packet data;
   a first detector configured to detect that the number of packet data has been transmitted via the transmission resource, and
   in response to the detection,
   a generator generates an acknowledgment message including the acknowledgment status of each of the number of packet data;
   the scheduler allocates another one of the plural data flows to the single transmission resource;
   a second detector configured to detect a predetermined event concerning a packet data flow currently not allocated to the single transmission resource; and
   in response to the second detection, the currently allocated data flow is interrupted.

14. The control device according to claim 13, wherein:
   the predetermined event is a negative acknowledgment concerning at least one packet of a packet data flow previously allocated to the single transmission resource.

15. The control device according to claim 13, wherein:
   the predetermined event is the occurrence of an additional packet data flow to the plural packet data flows.

16. The control device according to claim 13, wherein:
   the predetermined event is the occurrence of at least one new packet of a packet data flow previously allocated to the single transmission resource for which all previous packets were transmitted.

17. The control device according to claim 13, further comprising:
   a deallocating unit configured to deallocate the interrupted data flow currently allocated;

an allocating unit configured to allocate the data flow to the single transmission resource which data flow is influenced by the predetermined event; and a transmitter configured to transmit at least one packet of the packet data flow concerned by the predetermined event.

18. The control device according to claim 17, further comprising:

upon completion of the transmitting, the deallocating unit deallocates the data flow which is influenced by the predetermined event;

the allocating unit allocates the interrupted data flow to the single transmission resource; and wherein transmission of the interrupted packet data flow is resumed.

19. The control device according to claim 18, wherein:

another packet data flow is allocated upon completion of the resumed transmission of the interrupted packet data flow.

20. The control device according to claim 13, wherein:

the number of packets of a specific data flow is independent from the number of packets of other data flows.

21. The control device according to claim 13, wherein the number varies from time to time.

22. The control device according to claim 21, wherein:

the number of packets of a specific data flow is independent from the number of packets of other data flows.

23. The control device according to claim 13, wherein the number is determined during the transmission.

24. The control device according to claim 23, wherein:

the number of packets of a specific data flow is independent from the number of packets of other data flows.

25. A control device comprising:

allocating means for allocating one of a plurality of data flows to a single transmission resource for transmission, wherein each data flow uses a retransmission scheme providing for retransmission of packet data of a respective flow for which packet data a positive acknowledgment of delivery to a destination was not obtained and the data flow comprising a number of packet data;

detecting means for detecting that the number of packet data has been transmitted via the transmission resource, and in response to the detection, generating means for generating an acknowledgment message including the acknowledgment status of each of the number of packet data; and allocating means for allocating another one of the plural data flows to the single transmission resource;

second detecting means for detecting a predetermined event concerning a packet data flow currently not allocated to the single transmission resource; and interrupting means for interrupting the currently allocated data flow when the second detecting means detects the predetermined event.

* * * * *